(12) United States Patent
Li et al.

(10) Patent No.: US 9,415,376 B2
(45) Date of Patent: Aug. 16, 2016

(54) VISIBLE LIGHT CATALYST FOR REMOVING SULFUR-CONTAINING COMPOUNDS IN FUEL OIL, AND PREPARATION AND USE

(75) Inventors: Can Li, Dalian (CN); Zongxuan Jiang, Dalian (CN); Feng Lin, Dalian (CN); Donge Wang, Dalian (CN); Yongna Zhang, Dalian (CN)

(73) Assignee: DALIAN INSTITUTE OF CHEMICAL PHYSICS, CHINESE ACADEMY OF SCIENCES, Dalian (CN)

(*) Notice: Subject to any disclaimer, the term of this patent is extended or adjusted under 35 U.S.C. 154(b) by 384 days.

(21) Appl. No.: 14/009,353

(22) PCT Filed: Nov. 21, 2011

(86) PCT No.: PCT/CN2011/082513
§ 371 (c)(1),
(2), (4) Date: Oct. 2, 2013

(87) PCT Pub. No.: WO2012/136063
PCT Pub. Date: Oct. 11, 2012

(65) Prior Publication Data
US 2014/0021100 A1  Jan. 23, 2014

(30) Foreign Application Priority Data
Apr. 7, 2011  (CN) .......................... 2011 1 0087006

(51) Int. Cl.
*B01J 23/68* (2006.01)
*B01J 23/644* (2006.01)
(Continued)

(52) U.S. Cl.
CPC ............ *B01J 23/682* (2013.01); *B01J 23/6447* (2013.01); *B01J 23/6482* (2013.01);
(Continued)

(58) Field of Classification Search
None
See application file for complete search history.

(56) References Cited

FOREIGN PATENT DOCUMENTS

JP    2003033661 A  *  2/2003

OTHER PUBLICATIONS

Maruthamuthu, Visible light induced hydrogen production with Cu(II)/Bi2O3 and Pt/Bi2O3/RuO2 from aqueous methyl viologen solution, 1993, International Journal of Hydrogen Energy, vol. 18, issue 1, pp. 9-13.*

(Continued)

*Primary Examiner* — Melvin C Mayes
*Assistant Examiner* — Stefanie Cohen
(74) *Attorney, Agent, or Firm* — Enshan Hong; VLP Law Group LLP

(57) ABSTRACT

This invention relates to a visible-light-responsive photocatalyst for photocatalyticly oxidation desulphurization and method for preparation and application thereof. The catalyst is comprised of one type of metal $M_I$, one type of metal oxide $M_{II}O_x$ and $BiVO_4$ as the supporter, wherein the mass ratio of the sum of the two types of metal $(M_I+M_{II})$ to $BiVO_4$ is from 1:5000 to 1:50; the mass ratio of the type of metal $M_I$ to the type of metal $M_{II}$ is from 1:50 to 50:1. The catalyst is used in the photocatalytic oxidation desulphurization. Under mild condition (room temperature, 1 atm), using $O_2$ as the oxidant and xenon lamp (wavelength 420 nm<$\lambda$<700 nm) as the light source, avoid the oil's absorption of light (mainly in the violet area which is below 420 nm), the desulphurization ratio of thiophene can be above 90%, meanwhile the oil won't be excited. The sulfur in thiophene can be oxidized to $SO_3$ and absorbed by the absorbent after escaped from the reaction system. Thus extraction of the conventional oxidative desulphurization can be saved to lower the operation cost. The visible-light-responsive photocatalyst can be widely used in oil compared with the UV-light-responsive photocatalyst. We can recover the photocatalyst after the reaction by subsiding or centrifugation.

4 Claims, 3 Drawing Sheets

(51) Int. Cl.
  *B01J 23/648* (2006.01)
  *B01J 35/00* (2006.01)
  *C10G 27/04* (2006.01)
  *C10G 29/04* (2006.01)
(52) U.S. Cl.
  CPC .............. *B01J35/002* (2013.01); *B01J 35/004* (2013.01); *C10G 27/04* (2013.01); *C10G 29/04* (2013.01); *C10G 2300/202* (2013.01)

(56) References Cited

OTHER PUBLICATIONS

Matsuzawa et al, Photocatalytic oxidation of dibenzothiophenes in acetonitrile using TiO2: effect of hydrogen peroxide and ultrasound irradiation, Journal of Photochemistry and Photobiology A: Chemistry 2002, vol. 149, issues 1-3, pp. 183-189.*
English translation of JP2003-033661, 2003.*

* cited by examiner a) b)

VISIBLE LIGHT CATALYST FOR REMOVING SULFUR-CONTAINING COMPOUNDS IN FUEL OIL, AND PREPARATION AND USE

FIELD OF THE INVENTION

This invention relates to the desulphurization of sulfur compound, such as thiophene and its derivatives, in fuel oils. More particularly speaking, this invention relates to a photocatalyst co-loaded with dual co-catalysts and method for preparation and application thereof. This photocatalyst is a visible-light-responsive photocatalyticly oxidative catalyst to remove the thiophene, benzothiophene and dibenzothiophene present in fuel oils.

BACKGROUND OF THE INVENTION $SO_x$ produced from the burning of organic sulfur-containing compounds present in fuel oils not only can cause acid rain, but also can poison irreversibly the three-way catalysts in the tail gas cleanup systems of engines. Therefore, it has been receiving much attention. However, sulfur-containing compounds in fuels, especially gasoline, are actually very difficult to remove. The conventional hydrodesulphurization (HDS) method requires severe conditions (e.g., high temperature, high pressure, and high hydrogen consumption), which result in high operating-cost and a substantial octane loss, particularly for FCC gasoline. Therefore, it is highly desirable to develop non-HDS methods to meet the demands of producing clean gasoline with an extremely low sulfur level. Recently, oxidative desulphurization (ODS) is considered to be one of the most promising alternative processes due to the mild operation condition and no consumption of expensive $H_2$. However, thiophene, one of the main sulfur-containing compounds in FCC gasoline, is most difficult to be removed with the conventional oxidative desulphurization. As an energy-saving and environmentally friendly desulphurization process, photocatalytic oxidation desulphurization using molecular oxygen as the oxidant has received increasing attention in recent years.

F. Berthou (F. Berthou and V. Vignier, Int., J. Environ. Chem., 1986, 27, 81.) tried to desulfurize directly under sunlight, DBT (Dibenzothiophene) was dissolved in seawater and authors achieved a desulfurization rate of 80% after 8 days. However, the time of that process was too long and this process was not practical. bdelwahab and Gaber used anatase $TiO_2$ as the photocatalyst for photocatalytic oxidation of DBT in acetonitrile, they also analysed the reaction products (A. M. A. Abdel-wahab, A. E.-A. M. Gaber, J. Photochem. Photobiol. A, 1998, 114, 213.). Robertson and Bandosz prepared titanium (IV) oxide-hectorite nanofilm photocatalyst on quartz slides and used it to photooxidize DBT in tetradecane, which was used as a model for diesel fuel (Robertson and andosz, Applied Catalysis B: Environmental, 2004, 51, 195.). Matsuzawa et al. studied photocatalytic oxidation of DBT and 4,6-dimethyldibenzothiophene in MeCN using $TiO_2$ (S. Matsuzawa, J. Tanaka, S. Sato, T. Ibusuki, J. Photochem. Photobiol. A, 2002, 149, 183.). To lower the cost of the oxidant, they also tried to use oxygen to substitute $H_2O_2$.

Yasuhiro Shiraishi et al. (Yasuhiro Shiraishi et al., Ind.Eng.Chem.Res. 1996, 35, 586; Yasuhiro Shiraishi et al., Chem. Commun., 1998, 2601 ; Yasuhiro Shiraishi et al., Ind.Eng.Chem.Res., 1999, 38, 310; Yasuhiro Shiraishi et al., Ind.Eng.Chem.Res. 2000, 39, 1345; Yasuhiro Shiraishi et al., Journal of Chemical Engineering of Japan, 2002, 35, 489.). did many researches in the photosensitization of DBTs, they used the photosensitizers such as benzophenone and 9, 10-dicyanoanthracene (DCA). Jincai Zhao et al. used 2-(4-methoxyphenyl)-4,6-diphenylpyrylium ($MOPDPP^+BF^{4-}$) as the photosensitizer to photooxidize DBT to DBTO and $DBTO_2$ in $CH_3CN$ 100% in 10 h (Jincai Zhao et al., J. Phys. Chem. B, 2006, 110, 2942.). But the photosensitizer is easy to be oxidized and difficult to be separated, recovered after reaction. To improve the desulphurization efficiency furthermore researchers use other assistants such as ultrasound irradiation and γ irradiation to photooxidize DBT (Y usufg et al., Environ. Sci. Technol., 2005, 39, 8557; Naiqiang Yan et al., Energy & Fuels, 2006, 20, 142; Naiqiang Yan et al., Journal of Chemical Industry and Engineering (China), 2003, 54, 1279.).

It is obviously found from the prior part that the catalysts used in the photocatalytic oxidation desulphurization have some disadvantages: (1) The activity of catalyst needs to be further improved; (2) The photosensitizer is easy to be oxidized and difficult to be separated, recovered after reaction; and (3) Need other assistants and the operation cost is relatively high. Therefore, it is urgent to develop the visible-light-responsive semiconductor photocatalyst for photocatalytic oxidation desulphurization under visible light irradiation, which is environmentally friendly and easily recovered.

SUMMARY OF THE INVENTION

In accordance with this invention, an objective of the invention is to provide an highly reactive, environmentally friendly and easily recovered visible-light-responsive photocatalyst for photocatalytic oxidation desulphurization with high activity and method for the preparation and the application thereof.

In order to achieve the above objective, this invention provides the following aspects:

A visible-light-responsive photocatalyst for photocatalytic oxidation desulphurization, which is comprised of one type of metal $M_I$, one type of metal oxide $M_{II}O_x$ and $BiVO_4$ as the supporter, wherein the mass ratio of the sum of the two types of metal ($M_I+M_{II}$) to $BiVO_4$ is from 1:5000 to 1:50; the mass ratio of the type of metal $M_I$ to the type of metal $M_{II}$ is from 1:50 to 50:1.

Wherein the metal $M_I$ is selected from one of Pt, Pd or Au, and the metal $M_{II}$ is selected from one of Ru or Ir.

A method for preparing the said photocatalyst, comprising the steps of:

a) Firstly prepare $BiVO_4$ as the supporter:

Adding bismuth salt and vanadic salt (the mol ratio of the bismuth salt and vanadic salt is from 1:0.5 to 1:2) into 2 M $HNO_3$ (aq) to form a solution with the bismuth and vanadic concentration of from 0.05 to 0.5 mol $L^{-1}$; the pH value of the reaction mixture was adjusted to 1-3 with ammonia solution under vigorous stirring. After stirring for at room temperature, the reaction mixture was transferred into a Teflon-lined stainless steel autoclave, and aged at 100-250° C. for 12-48 hours. Filtration and washing with plenty amount of water afforded vivid yellow powder, which was dried at 50-200° C. overnight.

b) Impregnated the $BiVO_4$ supporter into the aqueous solution containing soluble salts of metal $M_{II}$. The catalyst precursor was obtained after vaporing the water present in the solution under vigorous stirring and calcination. Then added the catalyst precursor into the mixture solution of distilled water and methanol ($V_{water}:V_{methanol}$ is from 3:2 to 4:1) to form the suspension.

c) Mixed the suspension and the aqueous solution containing soluble salts of metal $M_I$, then conducted the photo reduction reaction.

The concentration of the aqueous solution containing soluble salts of metal $M_I$ in c) is 0.1-0.5 mg $M_I$ $mL^{-1}$. The concentration of the aqueous solution containing soluble salts of metal $M_{II}$ in b) is 0.5-1.5 mg $M_{II}$ mL$^{-1}$.

The vaporing under vigorous stirring in b) was conducted at a temperature of 50-90° C. for 3-6 hours. The calcination was conducted in air at a temperature of 100-500° C. for 0.5-4 hours.

The photo reduction reaction in c) was conducted with a xenon lamp (wavelength 420 nm<λ<700 nm) at a room temperature for 1-4 hours.

The said photocatalyst can be used for the photocatalytic oxidation desulphurization reaction, wherein the sulfur-containing compound is thiophene, benzothiophene or dibenzothiophene; adding 10-100 mg photocatalyst into 50 mL solution contained a sulfur-containing compound with $O_2$ bubbled in, wherein the temperature is from 10° C. to 20° C., reaction under vigorous stirring for 30-240 min with visible light irradiation. Separated and recovered the photocatalyst after reaction.

The visible light irradiation is from the xenon lamp with a wavelength from 420 nm to 700 nm.

Compared with the known technologies, the invention has the following advantages.

1. The invention design and synthesize a photocatalyst co-loaded with ultra-low loadings of dual co-catalysts. The visible-light-responsive photocatalyst exhibits high activity in the photocatalytic oxidation desulphurization, and is environmentally friendly, stable and easily recovered.

2. The oxidant used in the invention is $O_2$, which is environmentally friendly and lower cost.

3. The catalyst is used in the photocatalytic oxidation desulphurization. Under mild condition (room temperature, 1 atm), using $O_2$ as the oxidant and xenon lamp (wavelength 420 nm<λ<700 nm), avoids the oil's absorption of light (mainly in the violet area which is below 420 nm). The desulphurization ratio of thiophene can be above 90%; meanwhile the oil won't be excited.

4. The sulfur in thiophene can be oxidized to $SO_3$ and absorbed by the absorbent after escaped from the reaction system. Thus extraction of the conventional oxidative desulphurization can be saved to lower the operation cost. The visible-light-responsive photocatalyst can be widely used in oil compared with the UV-light-responsive photocatalyst. We can recover the photocatalyst after the reaction by subsiding or centrifugation.

BRIEF DESCRIPTION OF DRAWINGS

Table 1 is conversions and the main products of various sulfur-containing compounds in 3 h under visible light irradiation (λ≥420 nm) on Pt—$RuO_2$/$BiVO_4$ photocatalyst.

DETAILED DESCRIPTION OF THE INVENTION

Figure 1:
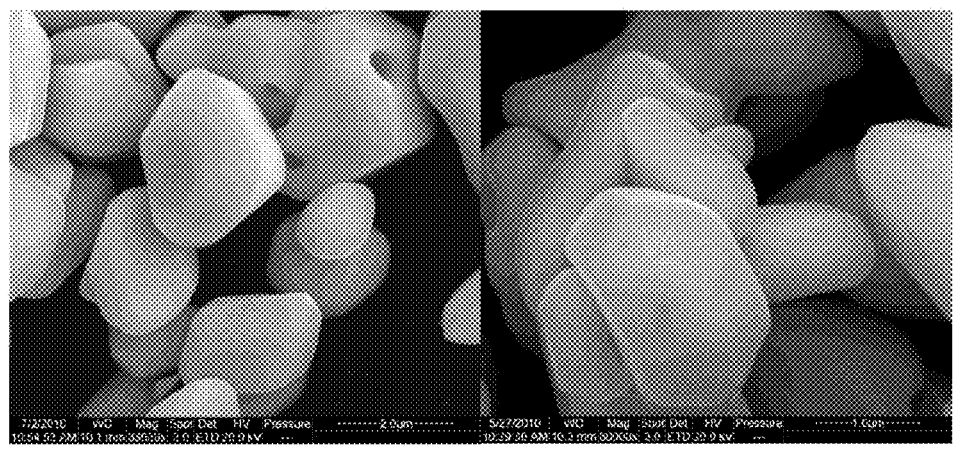
FIG. 1 is the SEM images of the photocatalyst as prepared in Example 1. The catalyst possesses large compact particles (about 2 mm in size).
Figure 2:
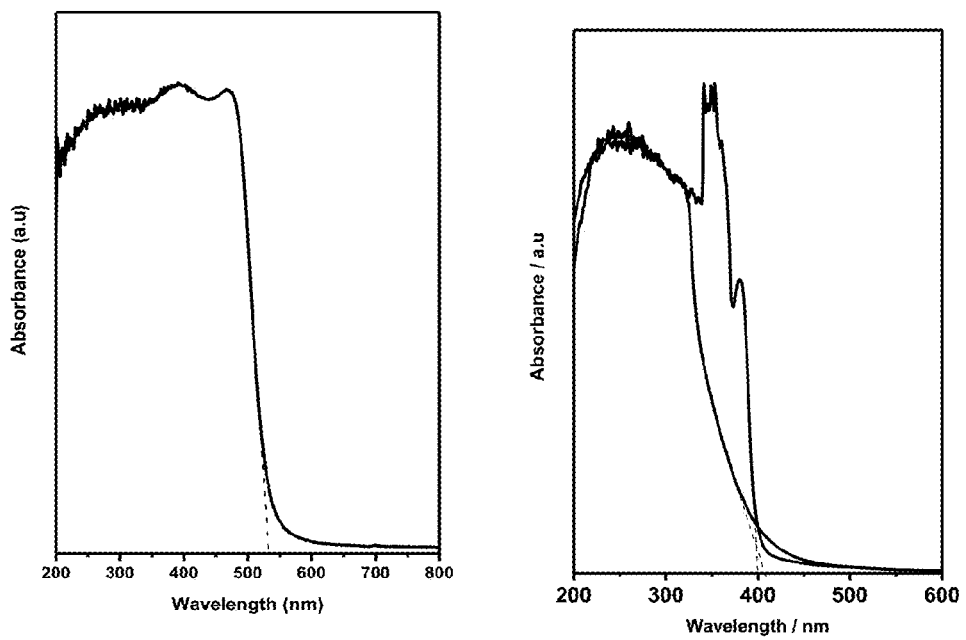
FIG. 2a) is the UV-Vis spectrum of the catalyst as prepared in Examples 1. The absorption edge of the catalyst is estimated to be 530 nm.
FIG. 2b) is the UV-Vis spectra of FCC gasoline and light diesel. The absorption edge of FCC gasoline and light diesel are estimated to be 420 nm. The visible-light-responsive photocatalyst can absorb the visible light beyond the absorption edge of FCC gasoline and light diesel when the oil won't absorb the light.
Figure 3:
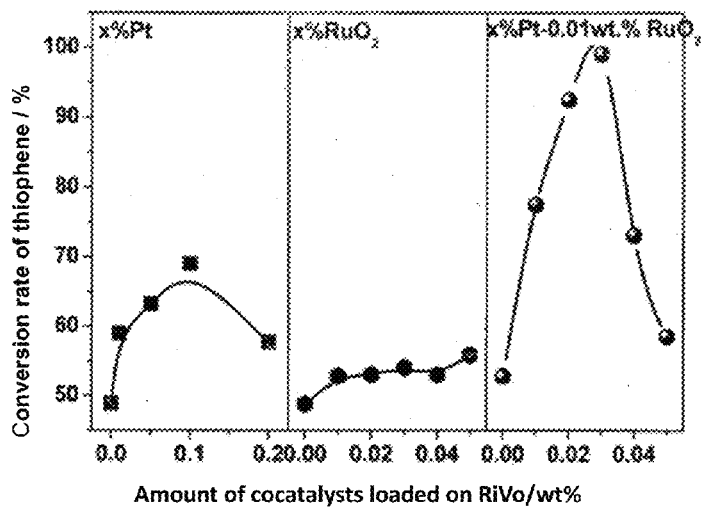
FIG. 3 is the photocatalytic activity of thiophene oxidation as a function of the loading amount of Pt alone, $RuO_2$ alone, and Pt, $RuO_2$ co-loaded on $BiVO_4$. x denotes the loading amount of co-catalyst. Reaction conditions: [sulfur content] initial=600 ppm; concentration of photocatalyst: 1 g L$^{-1}$; reaction time: 3 h.
Figure 4:
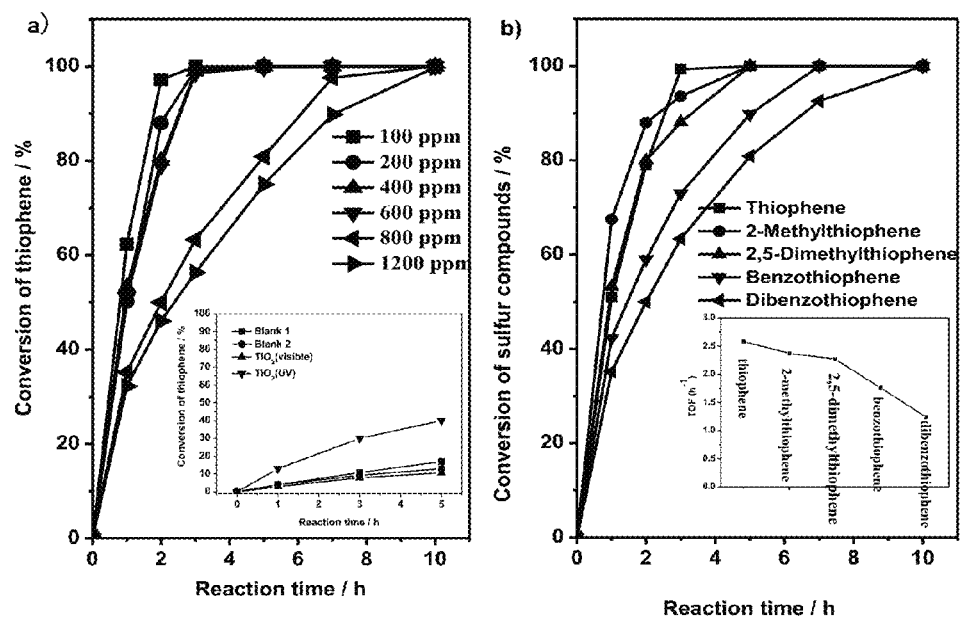
FIG. 4a) shows the photocatalytic activity of thiophene oxidation on Pt-$RuO_2$/$BiVO_4$ with different initial sulfur contents ([sulfur content]$_{initial}$=100 ppm, 200 ppm, 400 ppm, 800 ppm, 1200 ppm). Blank experiment 1 was carried out under the same condition with FIG. 3 except without the photocatalyst. Blank experiment 2 was carried out under the same condition with FIG. 3 except without the light irradiation. $TiO_2$ (visible) is the photocatalytic activity of thiophene oxidation on $TiO_2$ (P25) under visible light irradiation, $TiO_2$ (UV) is under ultraviolet light irradiation (>420 nm). $BiVO_4$ (visible) is the photocatalytic activity of thiophene oxidation on $BiVO_4$ under visible light irradiation. Reaction conditions: [sulfur content]$_{initial}$=600 ppm; reaction time: 5 h.
FIG. 4b) shows the photocatalytic oxidation activity and the corresponding TOF values of different sulfur-containing compounds (T=thiophene, 2-MT=2-methylthiophene, 2,5-DMT=2,5-dimethylthiophene, BT=benzothiophene, DBT=dibenzothiophene) on Pt-$RuO_2$/$BiVO_4$ under visible light irradiation (λ>420 nm). Reaction conditions: [sulfur content]$_{initial}$=600 ppm; reaction time: 10 h.
Figure 5:
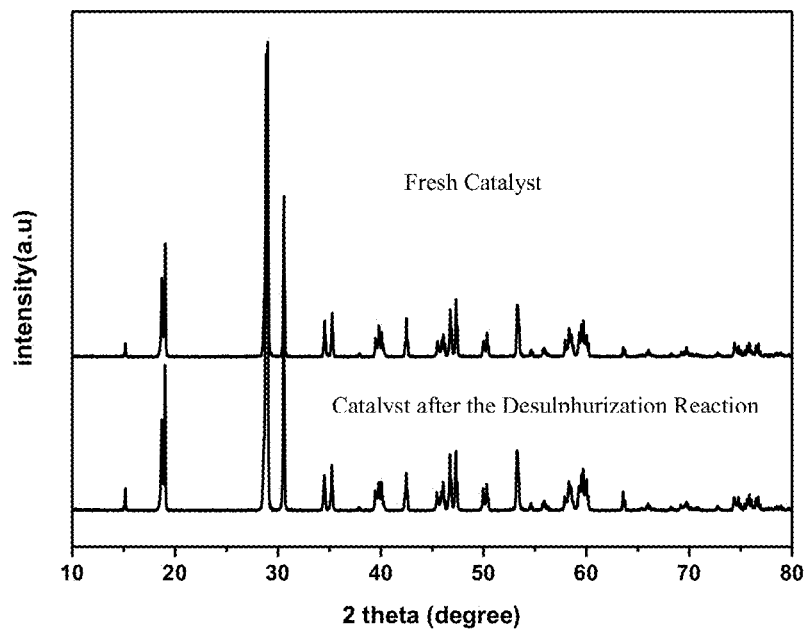
FIG. 5 is the XRD patterns of the fresh catalyst as prepared in Example 14 and the catalyst after the desulphurization reaction. The catalyst as prepared is monoclinic scheelite $BiVO_4$ and very stable even after the desulphurization reaction.
Figure 6:
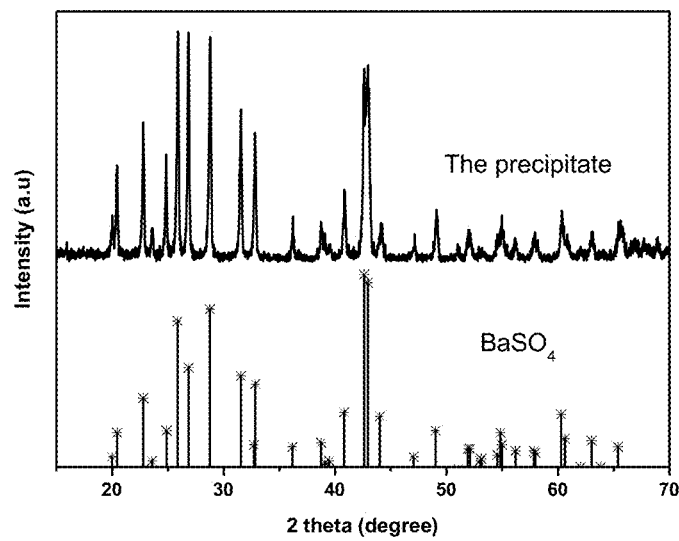
FIG. 6 is the XRD patterns of the white precipitate obtained in Example 16 and the standard card of $BaSO_4$. The XRD pattern was assigned to $BaSO_4$ which is in good agreement with the standard card of No. 24-1035. The sulfur in thiophene can be photocatalytic oxidized to $SO_3$ and escaped from the system.

The following examples are given by way of illustration and therefore should not be construed to limit the scope of the invention.

EXAMPLE 1

Preparation of $BiVO_4$ in the Invention

Adding bismuth salt and vanadic salt (the mol ratio of the bismuth salt and vanadic salt is 1:1 into 2 M $HNO_3$ (aq) to form a solution with the bismuth and vanadic concentration of 0.1 mol L$^{-1}$, the pH value of the reaction mixture was adjusted to 2.2 with ammonia solution under vigorous stirring. After stirring, the reaction mixture was transferred into a Teflon-lined stainless steel autoclave, and aged at 200° C. for 24 h. Filtration and washing with plenty amount of water afforded vivid yellow powder, which was dried at 90° C. overnight.

The use of $BiVO_4$ as prepared is in the photocatalytic oxidation desulphurization reaction:
(1) adding 50 mg photocatalyst A into 50 mL solution contained thiophene(the concentration of sulfur is 600 ppm) with $O_2$ bubbled in, wherein the temperature is 10° C., reaction under vigorous stirring for 180 min with visible light irradiation under atmospheric pressure conditions.
(2) Separated and recovered $BiVO_4$ after reaction. The sulfur content can be analyzed by GC-FPD, and the desulphurization ratio is 48.8%.

EXAMPLE 2

Preparation of the catalyst in the invention is as follows:
Iridium trichloride (0.050 g) was weighed and dissolved in 100 mL water to form a solution. The solution was continuously stirred for 30 min. 1.0 g $BiVO_4$ as prepared in example 1 was added into 5 mL solution above with ultrasonic treatment 1 h, after subsiding for 24 h the water present in the solution was vapored at 50° C. under vigorous stirring, and then calcined at 300° C. for 1 h to form the catalyst precursor. Added the catalyst precursor into the mixture solution of distilled water and methanol ($V_{water}$:$V_{methanol}$ is 4:1) to form the suspension. Then added 1 mL chloroplatinic acid (the concentration is 0.3578 mg Pt $mL^{-1}$) into the suspension under vigorous stirring. The suspension was irradiated for 1 h with $N_2$ (≥99.9%) bubbled in. After filtration, washing and vacuum drying the vivid yellow powder catalyst was obtained, the vivid yellow powder catalyst prepared in this example was denoted as Cat-A.

EXAMPLE 3

The catalyst denoted as Cat-B was prepared by the same method as Example 2 except that 0.420 g ruthenium trichloride was used instead of 0.050 g iIridium trichloride used in Example 2 and only used 0.5 mL of the solution.

EXAMPLE 4

The catalyst denoted as Cat-C was prepared by the same method as Example 2 except that 0.420 g ruthenium trichloride was used instead of 0.050 g iIridium trichloride used in Example 2 and only used 0.05 mL of the solution.

EXAMPLE 5

The use of catalysts is in the photocatalytic oxidation desulphurization reaction:
(1) Adding 0.100 g Cat-A into 50 mL solution contained thiophene (the concentration of sulfur is 600 ppm) with $O_2$ bubbled in, wherein the temperature is from 10° C., reaction under vigorous stirring for 180 min with visible light irradiation.
(2) Separated and recovered Cat-A after reaction. The sulfur content can be analyzed by GC-FPD, and the desulphurization ratio is 92.3%.

EXAMPLE 6

The process was conducted in the same way as Example 5 except that Cat-B was used instead of Cat-A. The sulfur content can be analyzed by GC-FPD, and the desulphurization ratio is 95.3%.

EXAMPLE 7

The process was conducted in the same way as Example 5 except that Cat-C was used instead of Cat-A. The sulfur content can be analyzed by GC-FPD, and the desulphurization ratio is 93.8%.

EXAMPLE 8

Preparation of another catalyst in the invention is as follows:
Ruthenium trichloride (0.420 g) was weighed and dissolved in 100 mL water to form a solution. The solution was continuously stirred for 30 min. 1.0 g $BiVO_4$ as prepared in example 1 was added into 0.05 mL solution above with ultrasonic treatment 1 h, after subsiding for 24 h the water present in the solution was vapored at 50° C. under vigorous stirring, and then calcined at 300° C. for 1 h to form the catalyst precursor. Added the catalyst precursor into the mixture solution of distilled water and methanol ($V_{water}$:$V_{methanol}$ is 4:1) to form the suspension. Then added 1 mL palladium chloride (the concentration is 0.37 mg Pd $mL^{-1}$) into the suspension under vigorous stirring. The suspension was irradiated for 1 h with $N_2$ (≥99.9%) bubbled in. After filtration, washing and vacuum drying the vivid yellow powder catalyst was obtained, and the vivid yellow powder catalyst prepared in this example was denoted as Cat-D.

EXAMPLE 9

The catalyst denoted as Cat-E was prepared by the same method as Example 8 except that 0.17 mL gold chloric acid (1.196 mg Au $mL^{-1}$) was used instead of 1 mL palladium chloride (the concentration is 0.37 mg Pd $mL^{-1}$) used in Example 8.

EXAMPLE 10

The catalyst denoted as Cat-F was prepared by the same method as Example 8 except that 0.56 mL chloroplatinic acid (the concentration is 0.3578 mg Pt $mL^{-1}$) was used instead of 1 mL palladium chloride (the concentration is 0.37 mg Pd $mL^{-1}$) used in Example 8.

EXAMPLE 11

The catalyst denoted as Cat-G was prepared by the same method as Example 8 except that 0.84 mL chloroplatinic acid (the concentration is 0.3578 mg Pt $mL^{-1}$) was used instead of 1 mL palladium chloride (the concentration is 0.37 mg Pd $mL^{-1}$) used in Example 8.

EXAMPLE 12

The use of catalysts is in the photocatalytic oxidation desulphurization reaction:
(1) adding 0.100 g Cat-D into 50 mL solution containing thiophene (the concentration of sulfur is 600 ppm) with $O_2$ bubbled in, wherein the temperature is 10° C., reaction under vigorous stirring for 180 min with visible light irradiation.
(2) Separated and recovered Cat-D after reaction. The sulfur content can be analyzed by GC-FPD, and the desulphurization ratio is 90.0%.

EXAMPLE 13

The process was conducted in the same way as Example 12 except that Cat-E was used instead of Cat-D. The sulfur content can be analyzed by GC-FPD, and the desulphurization ratio is 90.1%.

EXAMPLE 14

The process was conducted in the same way as Example 12 except that 0.050 g Cat-F was used instead of 0.100 g Cat-D. The sulfur content can be analyzed by GC-FPD, and the desulphurization ratio is 91.5%.

EXAMPLE 15

The process was conducted in the same way as Example 12 except that 0.050 g Cat-G was used instead of 0.100 g Cat-D. The sulfur content can be analyzed by GC-FPD, and the desulphurization ratio is 99.4%.

EXAMPLE 16

The air out of outlet in the example 15 was introduced to NaOH (0.2 M) for the further analysis After the reaction, When Ba(NO$_3$)$_2$ solution and HNO$_3$ (aq) were added into the NaOH solution, a white precipitate that couldn't be dissolved in HNO$_3$ (aq) appeared.

EXAMPLE 17

The process was conducted in the same way as Example 12 except that 0.050 g Cat-G was used instead of 0.100 g Cat-D, and 100 ppm thiophene was used instead of 600 ppm thiophene. The sulfur content can be analyzed by GC-FPD, and the desulphurization ratio is 100%.

EXAMPLE 18

The process was conducted in the same way as Example 12 except that 0.050 g Cat-G was used instead of 0.100 g Cat-D, and 200 ppm thiophene was used instead of 600 ppm thiophene. The sulfur content can be analyzed by GC-FPD, and the desulphurization ratio is 100%.

EXAMPLE 19

The process was conducted in the same way as Example 12 except that 0.050 g Cat-G was used instead of 0.100 g Cat-D, and 400 ppm thiophene was used instead of 600 ppm thiophene. The sulfur content can be analyzed by GC-FPD, and the desulphurization ratio is 99.3%.

EXAMPLE 20

The process was conducted in the same way as Example 12 except that 0.050 g Cat-G was used instead of 0.100 g Cat-D, and 800 ppm thiophene was used instead of 600 ppm thiophene. The visible light photocatalytic reaction was carried for 420 min under vigorous stirring. The sulfur content can be analyzed by GC-FPD, and the desulphurization ratio is 97.6%.

EXAMPLE 21

The process was conducted in the same way as Example 12 except that 0.050 g Cat-G was used instead of 0.100 g Cat-D, and 1200 ppm thiophene was used instead of 600 ppm thiophene. The visible light photocatalytic reaction was carried for 600 min under vigorous stirring. The sulfur content can be analyzed by GC-FPD, and the desulphurization ratio is 99.8%.

EXAMPLE 22

The process was conducted in the same way as Example 12 except that 0.050 g Cat-G was used instead of 0.100 g Cat-D, and 600 ppm 2-methyl thiophene was used instead of 600 ppm thiophene. The visible light photocatalytic reaction was carried for 300 min under vigorous stirring. The sulfur content can be analyzed by GC-FPD, and the desulphurization ratio is 100%.

EXAMPLE 23

The process was conducted in the same way as Example 12 except that 0.050 g Cat-G was used instead of 0.100 g Cat-D, and 600 ppm 2,5-dimethyl thiophene was used instead of 600 ppm thiophene. The visible light photocatalytic reaction was carried for 300 min under vigorous stirring. The sulfur content can be analyzed by GC-FPD, and the desulphurization ratio is 100%.

EXAMPLE 24

The process was conducted in the same way as Example 12 except that 0.050 g Cat-G was used instead of 0.100 g Cat-D, and 600 ppm benzothiophene was used instead of 600 ppm thiophene. The visible light photocatalytic reaction was carried for 420 min under vigorous stirring. The sulfur content can be analyzed by GC-FPD, and the desulphurization ratio is 100%.

EXAMPLE 25

The process was conducted in the same way as Example 12 except that 0.050 g Cat-G was used instead of 0.100 g Cat-D, and 600 ppm dibenzothiophene was used instead of 600 ppm thiophene. The visible light photocatalytic reaction was carried for 600 min under vigorous stirring. The sulfur content can be analyzed by GC-FPD, and the desulphurization ratio is 100%. It can be seen from all of the above examples that the catalysts exhibit high activity for photocatalytic oxidation desulphurization under mild condition and all of the catalysts can be reused by using the present method.

The visible-light-responsive photocatalyst can be widely used in oil compared with the UV-light-responsive photocatalyst. We can recover the photocatalyst after the reaction by subsiding or centrifugation. The co-loading oxidation and reduction co-catalysts is beneficial for the efficient separation and transfer of the photo-excited electrons and holes, which plays a significant role in the photocatalytic oxidation reaction. The photocatalytic oxidation of sulfur-containing organic compounds process with molecular oxygen as the oxidant is a possible process for ultra-deep desulphurization of gasoline.

TABLE 1

| Sulfur-containing compounds | structure | conversion (%) | main products detected |
|---|---|---|---|
| thiophene |  | 99.1 | $SO_3 + CO_2 + H_2O$ |
| 2-methylthiophene | 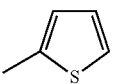 | 92.3 | $SO_3 + CO_2 + H_2O$ |

TABLE 1-continued

| Sulfur-containing compounds | structure | conversion (%) | main products detected |
|---|---|---|---|
| 2,5-dimethylthiophene | | 89.3 | $SO_3 + CO_2 + H_2O$ |
| benzothiophene | | 72.0 | |
| dibenzothiophene | | 62.8 | |

What is claimed is:

1. A method for preparing a visible-light-responsive photocatalyst for photocatalytic oxidation desulphurization, which is comprised of one type of metal $M_I$, one type of metal oxide $M_{II}Q_x$ and $BiVO_4$ as a supporter, wherein the mass ratio of the sum of the two types of metal $(M_I+M_{II})$ to $BiVO_4$ is from 1:5000 to 1:50; the mass ratio of the type of metal $M_I$ to the type of metal $M_{II}$ is from 1:50 to 50:1; wherein the metal $M_I$ is selected from a group consisting of Pt, Pd, and Au, and the metal $M_{II}$ is selected from a group consisting of Ru and Ir, wherein the method comprises steps of:

a) firstly preparing $BiVO_4$ as the supporter:
adding bismuth salt and vanadic salt with the mol ratio of 1:0.5 to 1:2 into 2 M $HNO_3$ (aq) to form a solution with the bismuth and vanadic concentration between 0.05 to 0.5 mol $L^{-1}$ the pH value of the reaction mixture is adjusted to 1-3 with ammonia solution under vigorous stirring; the reaction mixture is transferred into a Teflon-lined stainless steel autoclave, and aged at 100-250° C. for 12-48 hours to form a powder; the powder is filtrated and washed with water and finally dried at 50-200° C. overnight;

b) impregnating the $BiVO_4$ supporter with an aqueous solution containing soluble salts of metal $M_{II}$; a catalyst precursor is obtained after evaporating the water present in the solution under vigorous stirring and calcination; and then adding the catalyst precursor into the mixture solution of distilled water and methanol with $V_{water}:V_{methanol}$ of 3:2 to 4:1 to form a suspension; and c) mixing the suspension and an aqueous solution containing soluble salts of metal $M_I$ with visible light irradiation, then conducting a photo reduction reaction.

2. The method according to claim 1, wherein the concentration of the aqueous solution containing soluble salts of metal $M_I$ in c) is 0.1-0.5 mg $M_I$ $mL^{-1}$; the concentration of the aqueous solution containing soluble salts of metal $M_{II}$ in b) is 0.5 -1.5 mg $M_{II}$ $mL^{-1}$.

3. The method according to claim 1, wherein the evaporating under vigorous stirring in b) is conducted at a temperature of 50-90° C. for 3-6 hours; the calcination is conducted in air at a temperature of 100-500° C. for 0.5-4 hours.

4. The method according to claim 1, wherein the photo reduction reaction is conducted with a xenon lamp (wavelength 420 nm<λ<700 nm) at a room temperature for 1-4 hours.

* * * * *